US010010950B2

(12) United States Patent
Matsumura et al.

(10) Patent No.: US 10,010,950 B2
(45) Date of Patent: Jul. 3, 2018

(54) CUTTING INSERT HAVING A VARIABLE-WIDTH LAND AND CUTTING TOOL

(71) Applicant: TUNGALOY CORPORATION, Iwaki-shi, Fukushima (JP)

(72) Inventors: Takahiro Matsumura, Iwaki (JP); Satoru Yoshida, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 163 days.

(21) Appl. No.: 15/129,467

(22) PCT Filed: Mar. 26, 2015

(86) PCT No.: PCT/JP2015/059499
§ 371 (c)(1),
(2) Date: Sep. 27, 2016

(87) PCT Pub. No.: WO2015/147220
PCT Pub. Date: Oct. 1, 2015

(65) Prior Publication Data
US 2017/0225243 A1    Aug. 10, 2017

(30) Foreign Application Priority Data

Mar. 27, 2014  (JP) .................. 2014-066437

(51) Int. Cl.
*B23C 5/20* (2006.01)
*B23C 5/06* (2006.01)

(52) U.S. Cl.
CPC ................ *B23C 5/06* (2013.01); *B23C 5/207* (2013.01); *B23C 2200/0422* (2013.01);
(Continued)

(58) Field of Classification Search
CPC ........... B23C 5/20; B23C 5/202; B23C 5/207; B23B 2200/0422; B23B 2200/08;
(Continued)

(56) References Cited

U.S. PATENT DOCUMENTS 5,199,827 A    4/1993  Pantzar
5,827,016 A *  10/1998 Strand ................... B23C 5/202
                                                407/115
(Continued)

FOREIGN PATENT DOCUMENTS

EP    0 314 647 A2    5/1989
EP    1 066 903 A2    7/2000
(Continued)

OTHER PUBLICATIONS

Supplementary Partial European Search Report dated Dec. 4, 2017, from corresponding EP Appl No. 15 76 8519, 10 pp.
(Continued)

*Primary Examiner* — Will Fridie, Jr.
(74) *Attorney, Agent, or Firm* — Studebaker & Brackett PC

(57) ABSTRACT

A cutting insert has an upper surface, a lower surface, a side surface connecting the upper and lower surfaces. An intersecting edge between the upper surface and the side surface is provided with a cutting edge. The cutting edge has, in order, a second major cutting edge, a first major cutting edge, a corner cutting edge connected to these major cutting edges, and a flat cutting edge. An obtuse interior first angle (θ) is formed by the second and first major cutting edges. A interior second angle (α) formed by the flat cutting edge and the first major cutting edge is larger than an interior third angle (β) formed by the flat cutting edge and the second
(Continued)

major cutting edge. A land is provided adjacent to the first major cutting edge, a width of the land increasing toward the first corner cutting edge.

20 Claims, 9 Drawing Sheets

(52) U.S. Cl.
CPC .. *B23C 2200/125* (2013.01); *B23C 2200/128* (2013.01); *B23C 2200/201* (2013.01); *B23C 2200/203* (2013.01); *B23C 2200/208* (2013.01); *B23C 2200/366* (2013.01); *B23C 2210/045* (2013.01)

(58) Field of Classification Search
CPC ........ B23B 2200/083; B23B 2200/125; B23B 2200/12; B23B 2200/128; B23B 2200/209; B23B 2200/203; B23B 2200/208; B23B 2200/045
See application file for complete search history.

(56) References Cited

U.S. PATENT DOCUMENTS

| | | | |
|---|---|---|---|
| 6,116,824 A * | 9/2000 | Strand | B23C 5/2213 407/114 |
| 6,254,316 B1 * | 7/2001 | Strand | B23C 5/202 407/113 |
| 6,607,335 B2 * | 8/2003 | Morgulis | B23C 5/202 407/114 |
| 2010/0221076 A1 | 9/2010 | Takahashi et al. | |
| 2012/0070240 A1 | 3/2012 | Ishi et al. | |
| 2012/0189396 A1 | 7/2012 | Xu | |
| 2012/0282048 A1 | 11/2012 | Kountanya | |
| 2012/0301235 A1 | 11/2012 | Yoshioka et al. | |
| 2013/0142580 A1 | 6/2013 | Konta | |
| 2017/0189972 A1 * | 7/2017 | Matsumura | B23C 5/207 |

FOREIGN PATENT DOCUMENTS

| | | |
|---|---|---|
| EP | 1 902 799 A2 | 3/2008 |
| EP | 2 022 584 A1 | 2/2009 |
| EP | 2412464 | 2/2010 |
| JP | 2015/100901 A | 6/2015 |

OTHER PUBLICATIONS

International Search Report dated Jun. 5, 2015 issued in counterpart International (PCT) Application (No. PCT/JP2015/059499).
Written Opinion dated Jun. 5, 2015 issued in counterpart International (PCT) Application (No. PCT/JP2015/059499).

* cited by examiner

CUTTING INSERT HAVING A VARIABLE-WIDTH LAND AND CUTTING TOOL

RELATED APPLICATIONS

This is a 371 US National Phase of International Patent Application No. PCT/JP2015/059499 filed Mar. 26, 2015, and published as WO 2015/147220A1 on Oct. 1, 2015, which claims priority to JP 2014-066437, filed Mar. 27, 2014. The contents of the aforementioned applications are incorporated by reference in their entirety.

Technical Field

The present invention relates to a cutting insert used for a cutting tool, in particular, a cutting insert used for a rotating tool. The present invention also relates to a body on which the cutting insert is mounted and to a cutting tool.

Background Art

Conventionally, there has been a cutting tool for rotary cutting which has an upper surface and a bottom surface each having a pentagonal shape and a side surface connecting the upper and bottom surfaces, as shown in, for example, FIG. 3 of Patent Document 1. Intersecting edges between the upper and bottom surfaces and the side surface in such cutting insert are provided with cutting edges, being a cutting edge portion group having a set of a major cutting edge, a minor cutting edge and a flat cutting edge which have a linear shape, as well as a first corner cutting edge and a second corner cutting edge which have a curved shape and which connect between the major cutting edge and the minor cutting edge and between the minor cutting edge and the flat cutting edge, respectively. The cutting insert in Patent Document 1 has five sets of such cutting edge portion groups on one surface, i.e., ten sets in total on both surfaces. An angle formed by the minor cutting edge and the major cutting edge is an obtuse angle and an angle formed by the flat cutting edge and the minor cutting edge is larger than an angle formed by the flat cutting edge and the major cutting edge. In addition, Patent Document 1 also discloses that a major cutting edge land portion corresponding to the major cutting edge and a minor cutting edge land portion corresponding to the minor cutting edge are provided and the width ratio between the major cutting edge land portion and the minor cutting edge land portion is preferably from 1:0.7 to 1:1.3.

CITATION LIST

Patent Document

Patent Document 1: WO2010/150907

SUMMARY

Technical Problem

In the conventional cutting insert as described in Patent Document 1, the corner cutting edges and their vicinity are relatively pointed as compared to the linear cutting edge portions, such as the major cutting edges, and the corner cutting edges and their vicinity are therefore chipped more easily than the linear cutting edge portions even when the same magnitude of cutting resistance is applied. Increasing the radius of curvature of the corner cutting edges may be a possible countermeasure against this problem. In that case, however, if the size of the cutting insert is not changed, then the lengths of the other cutting edge portions, such as the flat cutting edges and the major cutting edges, have to be shortened, and such countermeasure cannot always be employed in situations where specifications such as the lengths of cutting edges, etc. are predetermined.

An object of the present invention is to provide a cutting insert in which a corner cutting edge and its vicinity are resistant to fracture without increasing the radius of curvature of the corner cutting edge.

Solution to Problem

A cutting insert according to the present invention is a cutting insert comprising an upper surface, a lower surface, and a side surface connecting the upper surface and the lower surface, wherein: an intersecting edge between the upper surface and the side surface is partially or entirely provided with a cutting edge; the cutting edge comprises a linear or curved first major cutting edge, a linear or curved second major cutting edge connected to the first major cutting edge, a substantially arc-like corner cutting edge connected to the first major cutting edge on an opposite side of the second major cutting edge, and a linear or curved flat cutting edge connected to the corner cutting edge on an opposite side of the first major cutting edge; an angle formed by the linear second major cutting edge or a chord formed by connecting both ends of the curved second major cutting edge, and the linear first major cutting edge or a chord formed by connecting both ends of the curved first major cutting edge, is an obtuse angle; an interior angle formed by the flat cutting edge and the linear first major cutting edge or the chord of the curved first major cutting edge is larger than an interior angle ($\beta$) formed by the flat cutting edge and the linear second major cutting edge or the chord of the curved second major cutting edge; a land is provided adjacent to the first major cutting edge on the upper surface; and a width of the land increases toward the corner cutting edge.

The cutting insert according to the present invention is preferably configured such that: the land is also provided adjacent to the second major cutting edge on the upper surface, a width of the land increases toward the corner cutting edge, and a rate of increase of the width of the land adjacent to the first major cutting edge is larger than a rate of increase of the width of the land adjacent to the second major cutting edge.

The cutting insert according to the present invention is preferably configured such that the rate of increase of the width of the land adjacent to the first major cutting edge is two to five times larger than the rate of increase of the width of the land adjacent to the second major cutting edge.

The cutting insert according to the present invention is preferably configured such that, in a side view, the second major cutting edge and the first major cutting edge are inclined with respect to the lower surface and a direction of inclination is set such that the second major cutting edge and the first major cutting edge approach the lower surface as the distances from the corner cutting edge increase.

The cutting insert according to the present invention may be configured such that an intersecting edge with an intersecting edge part between the lower surface and the side surface is also partially or entirely provided with cutting edges having the same shape as and 180-degrees rotationally symmetric to the cutting edges formed on the intersecting edge between the upper surface and the side surface.

The cutting insert according to the present invention is preferably configured such that the side surface is provided with a first inclined surface arranged on an upper surface side and a second inclined surface arranged on a lower surface side with respect to the first inclined surface, the first inclined surface being inclined such that a portion closer to the lower surface is located closer to a center of the cutting insert, the second inclined surface being inclined such that a portion closer to the upper surface is located closer to the center of the cutting insert.

A body according to the present invention is a body on which the cutting insert having the above configurations is mounted, wherein: the body comprises an insert mounting seat for mounting the cutting insert; the insert mounting seat comprises a first side wall; and the first side wall comprises a projected part that is brought into contact with the second inclined surface formed in the side surface of the cutting insert.

The body according to the present invention is preferably configured such that: an outer shape of the body is cylindrical; the insert mounting seat further comprises a second side wall that is located on an outer circumferential side of the body with respect to the first sidewall; and the second side wall comprises a projected part that is brought into contact with the first inclined surface formed in the side surface of the cutting insert.

The present invention also resides in a cutting tool comprising the above-mentioned cutting insert.

Advantageous Effects of Invention

In the cutting insert according to the present invention, the interior angle formed by the flat cutting edge connected to the corner cutting edge and the first major cutting edge is larger than the interior angle formed by the flat cutting edge and the second major cutting edge, and the width of the land formed adjacent to the first major cutting edge connected to the corner cutting edge on the upper surface increases toward the corner cutting edge. When the land is formed adjacent to a cutting edge, chips tend to be discharged in a direction at right angles to an edge of the land and the direction in which the chips are discharged is thus inclined from a direction at right angles to the first major cutting edge toward the opposite side of the corner cutting edge. Since this direction is a direction away from a surface of a workpiece, a load to be applied to the corner cutting edge will be reduced and the corner cutting edge will become resistant to chipping. In addition, since the width of the land is maximized in the vicinity of the corner cutting edge, the corner cutting edge itself is strengthened.

DESCRIPTION OF EMBODIMENTS

Figure 1:
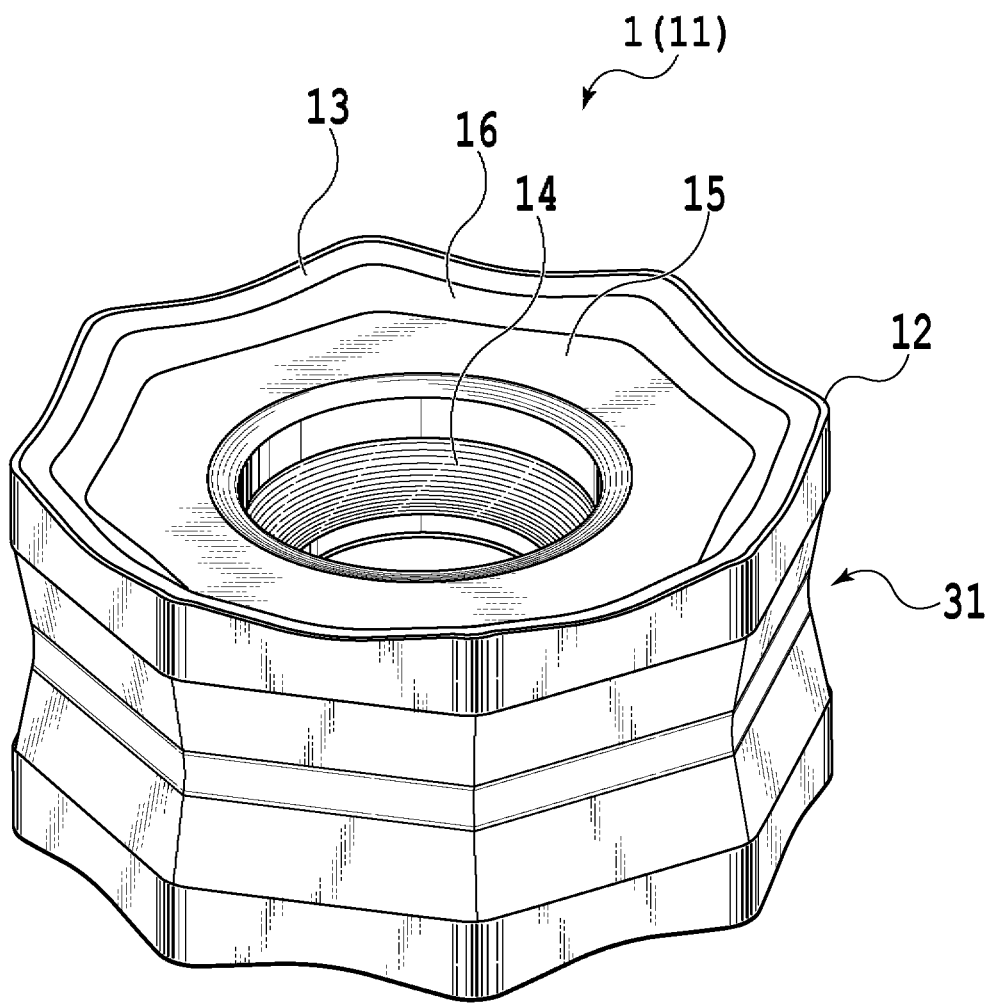
FIG. 1 is a perspective view showing a cutting insert according to an embodiment of the present invention.
Figure 2:
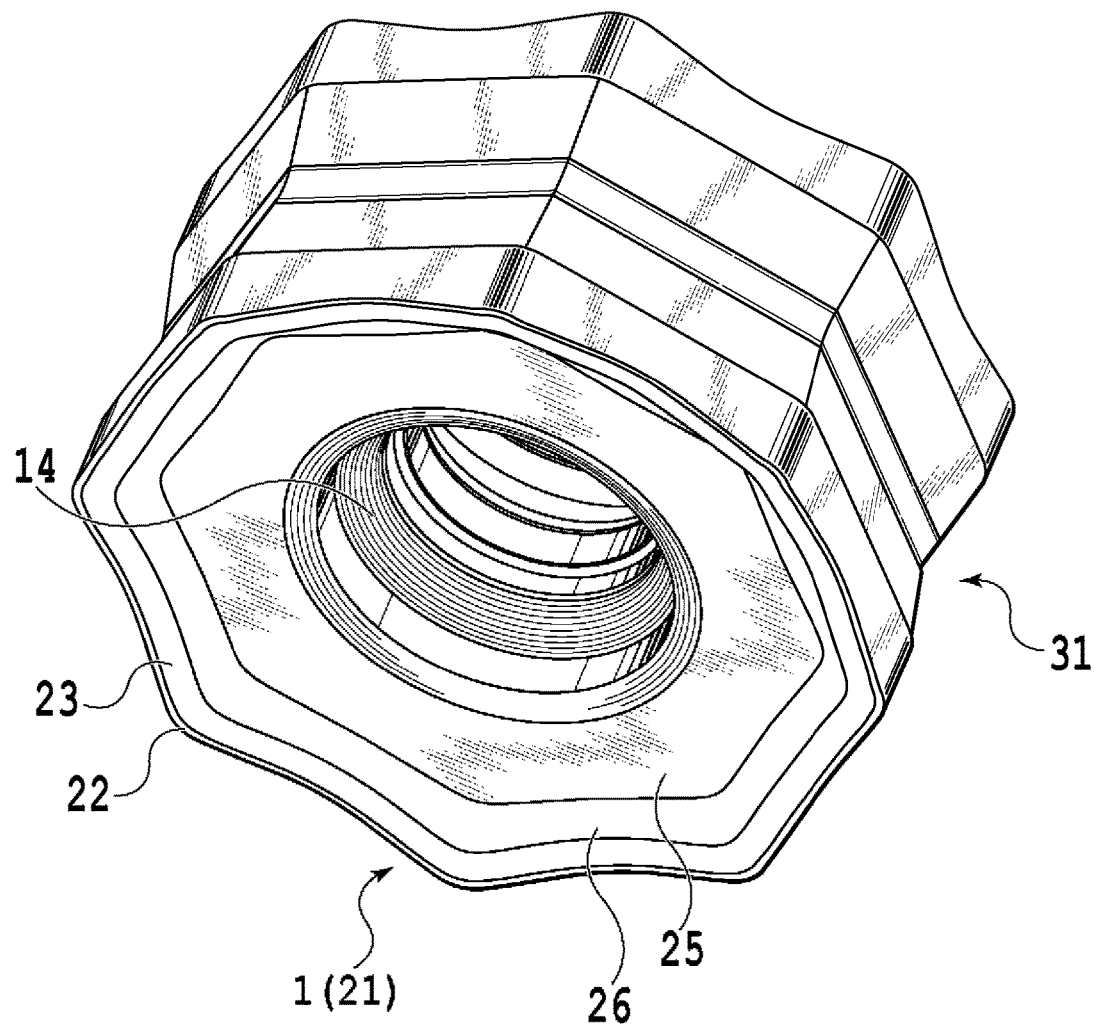
FIG. 2 is a perspective view showing the cutting insert of FIG. 1 as viewed from another angle.

An embodiment of the present invention will be described below with reference to the attached drawings.

Although terms expressing orientations and positions in a space, such as upper and lower, are used for each surface in the specification and the claims, such terms are not intended to define the absolute orientation or absolute positional relationship of each surface in the space. Specifically, an "upper surface" refers to a surface on which cutting edges will appear when a cutting insert is mounted to a tool body and a "lower surface" refers to a surface on a side which is brought into contact with an insert seat of the tool body, for the sake of convenience. In the cutting insert of the present embodiment, the upper surface and lower surface have the same shape, as will be described later, and if the cutting insert is mounted on the tool body with the upper surface and lower surface being turned upside down, the positional relationship between the surfaces will be inverted. The same applies to terms used to express other orientations and positional relationships in a space, unless otherwise indicated.

As shown in FIGS. 1 to 4, a cutting insert 1 includes an upper surface 11 having a basic shape of a regular octagon in a planar view, a lower surface 21 having the same shape as the upper surface 11, and a side surface 31 having a recessed part 32 in its central part. An intersecting edge between the upper surface 11 and the side surface 31 and an intersecting edge between the lower surface 21 and the side surface 31 is provided with an upper cutting edge 4. In the present embodiment, the width between two opposing sides, i.e., the diameter of an inscribed circle, of the upper surface 11 having the regular octagon shape is 13 mm. The upper surface 11 includes a land 12 having a positive land angle, an inclined surface 13 that is adjacent to the land 12 and has a positive rake angle, a connecting surface 16, and a contacting surface 15 capable of coming into contact with an insert mounting seat formed in a body. The lower surface 21 also includes, in the same way as the upper surface 11, a land 22 having a positive land angle, an inclined surface 23 that is adjacent to the land 22 and has a positive rake angle, a connecting surface 26, and a contacting surface 25 capable of coming into contact with the insert mounting seat formed in the body. The contacting surfaces 15 and 25 are formed in parallel to each other. Accordingly, the cutting insert 1 has the same shape even when it is turned upside down. In other words, the cutting insert 1 has a 180-degree rotationally symmetric shape about an axis that is parallel to the contacting surfaces 15 and 25 and passes the center of the cutting insert 1. The cutting insert 1 includes a through hole 14 that perpendicularly penetrates the upper surface 11 and the lower surface 21 and, when the cutting insert 1 is mounted on a body 101, a fastener such as a screw is inserted into the through hole 14 to fix the cutting insert 1.

Figure 3:
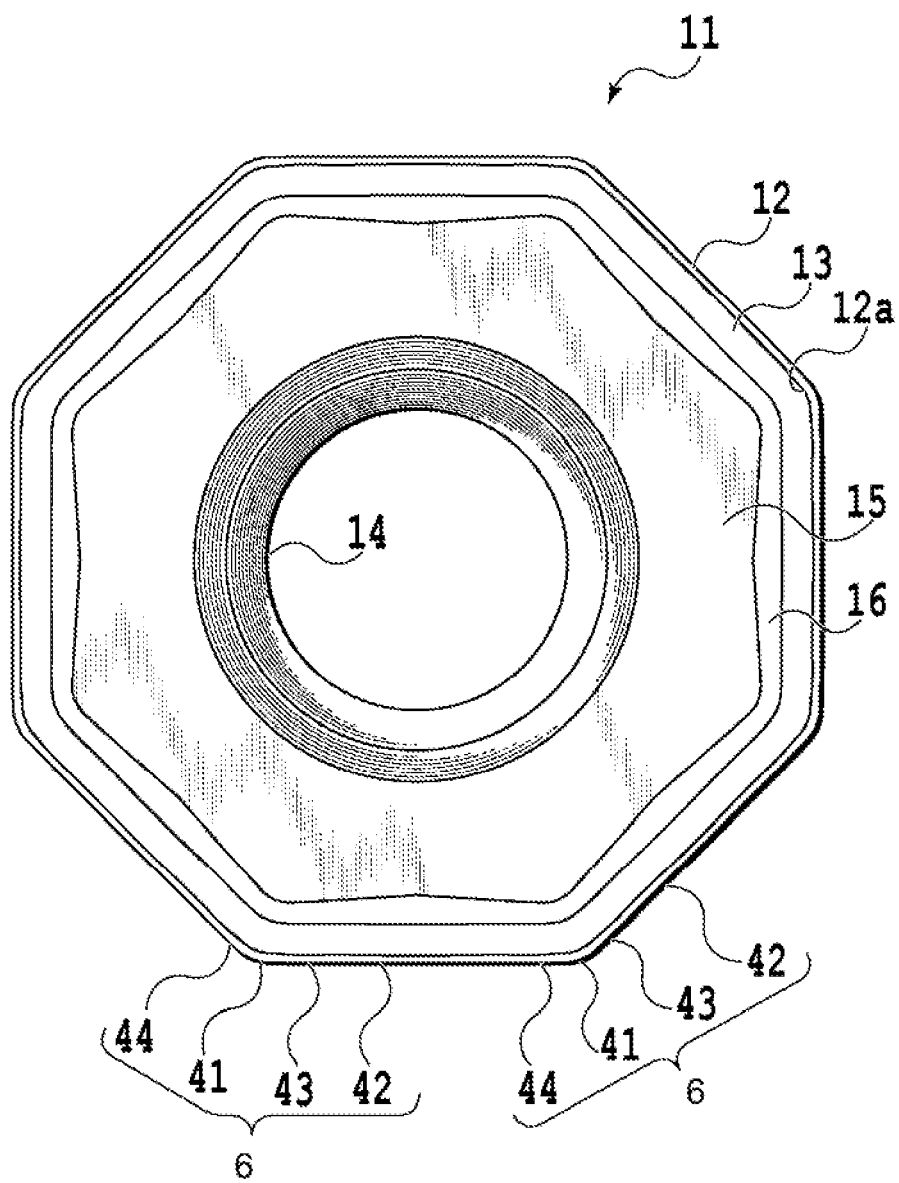
FIG. 3 is a top view showing the cutting insert of FIG. 1.

As shown in FIG. 3, in a planar view of the cutting insert 1, the upper cutting edge 4 includes a plurality of cutting edge portion groups 6. Each cutting edge portion group 6 includes a set of linear second major cutting edge 42, a second corner cutting edge 45 connected to the second major cutting edge 42 (see FIG. 5), a linear first major cutting edge 43 connected to the second corner cutting edge 45, a first corner cutting edge 41 that is connected to the first major cutting edge 43 and curved toward an outer side of the cutting insert 1, and a flat cutting edge 44 connected to the first corner cutting edge 41, the cutting edges being sequentially formed along the intersecting edge between the upper surface 11 and the side surface 31. The upper surface 11 of the cutting insert 1 of the present embodiment has eight sets of such cutting edge portion groups, in which the second major cutting edge 42 of each cutting edge portion group is connected to the flat cutting edge 44 that belongs to an adjacent cutting edge portion group. It should be noted that a first angle formed by the first major cutting edge 43 and the second major cutting edge 42 is minute and the first major cutting edge 43 and the second major cutting edge 42 can be regarded as directly intersecting with each other not via the second corner cutting edge 45.

Figure 4:
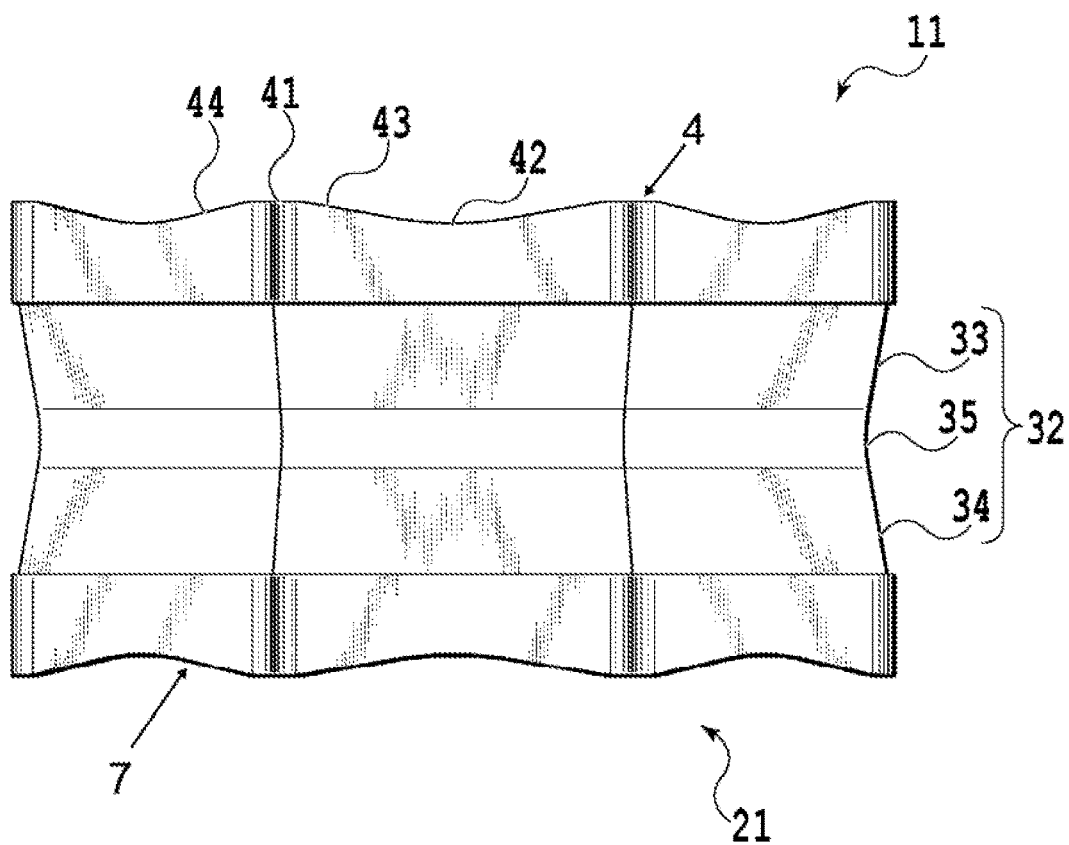
FIG. 4 is a side view showing the cutting insert of FIG. 1.

As shown in FIG. 4, in a side view of the cutting insert 1, the second major cutting edge 42, the first major cutting edge 43 and the flat cutting edge 44 are all inclined so as to approach the lower surface 21 as the distances from the first corner cutting edge 41 increase. The lower cutting edge 7 formed on the intersecting edge between the lower surface 21 and the side surface 31 also has the same shape that is 180-degrees rotationally symmetric to the upper cutting edge 4 formed on the intersecting edge between the upper surface 11 and the side surface 31.

Figure 5:
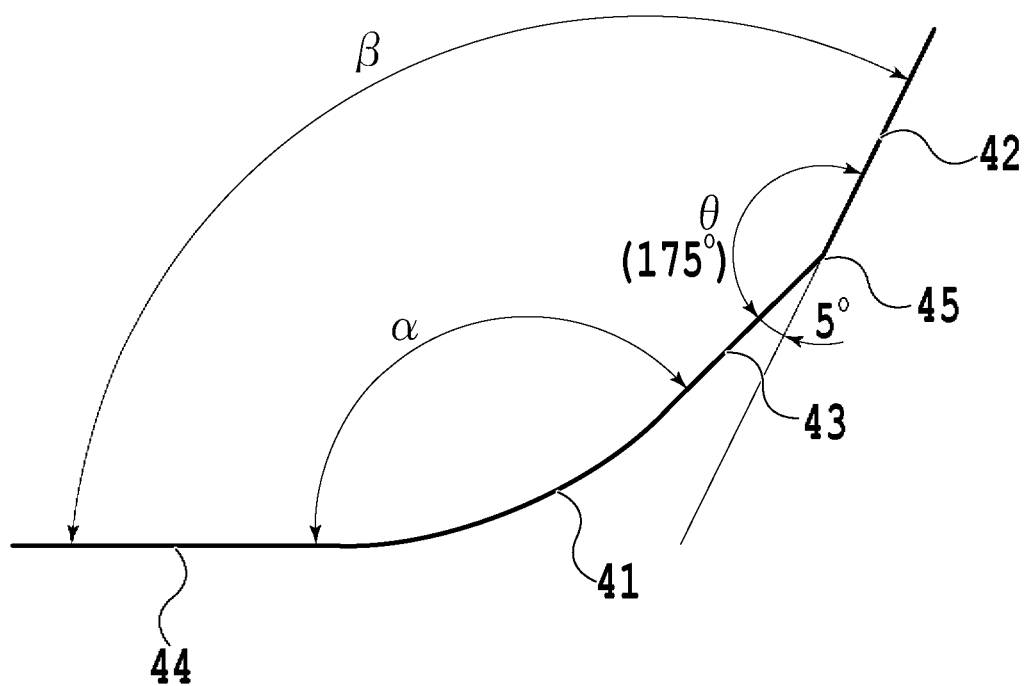
FIG. 5 is an enlarged view schematically showing part of cutting edges of the cutting insert of FIG. 1 in order to explain an angular relationship among a first major cutting edge, a second major cutting edge and a flat cutting edge.

FIG. 5 is an enlarged view schematically showing one cutting edge portion group. In order to aid in easier understanding of the feature of each part, the angle and length of such part are depicted in an exaggerated manner. As shown in FIG. 5, the second major cutting edge 42 and the first major cutting edge 43 intersect with each other such that the interior angle is an obtuse angle and the intersecting interior first angle θ in the present embodiment is about 175 degrees. Thus, an interior second angle α of the angle formed by the by the flat cutting edge 44 and the first major cutting edge 43 is 5 degrees larger than an interior third angle β of the angle formed by the flat cutting edge 44 and the second major cutting edge 42. Herein, the term "interior angle" refers to an angle formed by cutting edge portions, which is measured from an inner side of the cutting insert 1, as shown in FIG. 5.

A recessed part 32 is formed in each of eight side surface portions. The recessed part 32 includes a first inclined surface 33 that is inclined so as to approach the center of the cutting insert 1 from the upper surface 11 toward the lower surface 21 and a second inclined surface 34 that is located on the lower surface 21 side with respect to the first inclined surface 33 and inclined so as to approach the center of the cutting insert 1 from the lower surface 21 toward the upper surface. The first inclined surface 33 and the second inclined surface 34 are connected via a curved surface 35.

Figure 6:
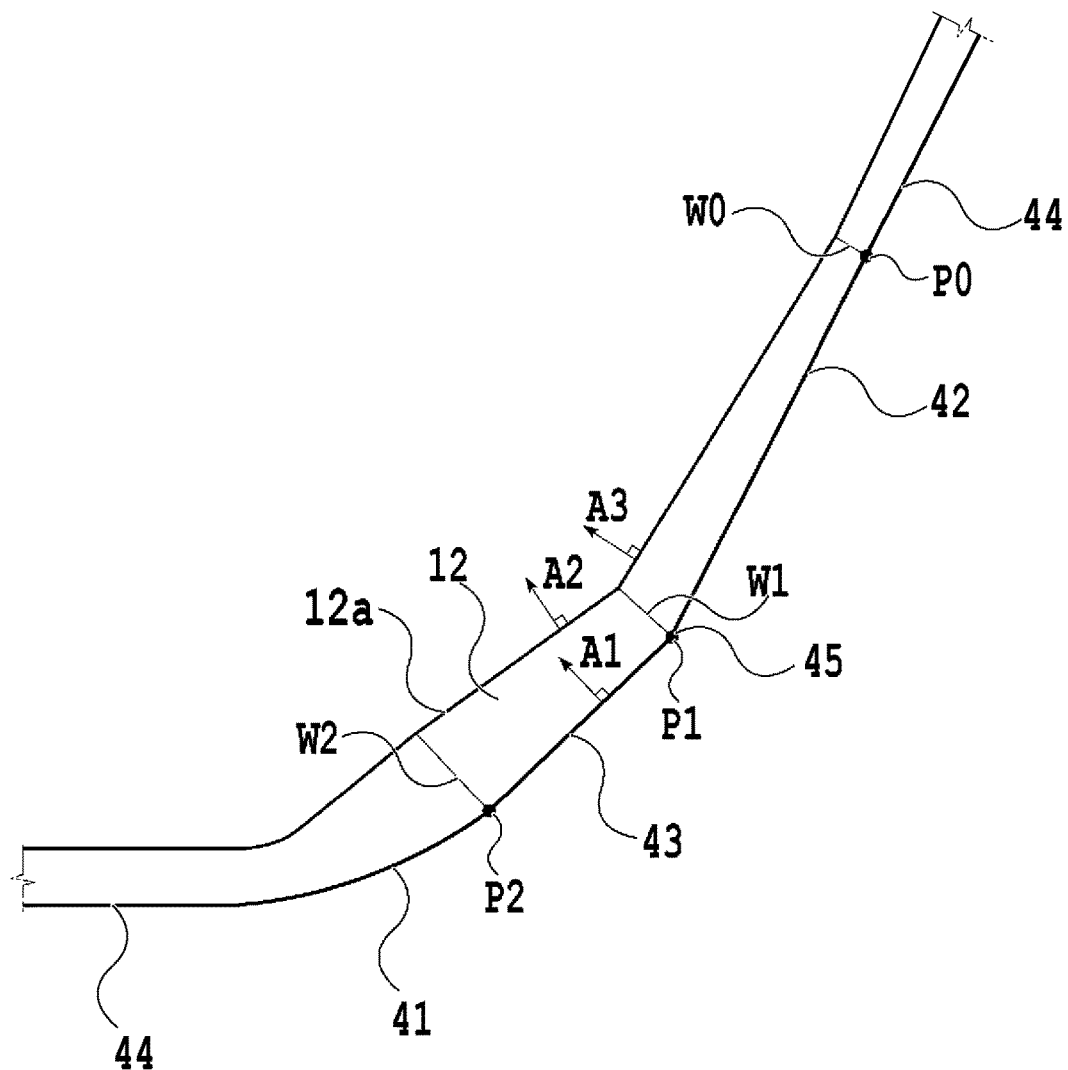
FIG. 6 is an enlarged view schematically showing part of cutting edges of the cutting insert of FIG. 1 in order to explain a manner of forming a land for the first and second major cutting edges.

The land angle of the land 12 is constant at any position and the land angle in the present embodiment is 5 degrees. In a planar view of the cutting insert 1 (FIG. 3), when a length from the edge of the upper surface 11 to an edge line 12a between the land 12 and the inclined surface 13 is defined as a "width" of the land, the width of the land adjacent to the first major cutting edge 43 increases toward the first corner cutting edge 41 as shown in FIG. 6. In the first major cutting edge 43 of the present embodiment, a width W1 of the land at a position corresponding to an end which is farther away from the first corner cutting edge 41 (a position P1 shown in FIG. 6) is 0.20 mm, whereas a width W2 of the land at a position corresponding to a connecting part with the first corner cutting edge 41 (a position P2 shown in FIG. 6) is 0.30 mm.

The width of the land adjacent to the second major cutting edge 42 also increases toward the first corner cutting edge 41, in the same way as the land adjacent to the first major cutting edge 43. In the second major cutting edge 42 of the present embodiment, a width W0 of the land at a connecting part with the flat cutting edge 44 belonging to an adjacent cutting edge portion group, which corresponds to an end farther away from the first corner cutting edge 41 (a position P0 shown in FIG. 6), is 0.10 mm, whereas the width W1 of the land at a position corresponding to a connecting part with the first major cutting edge 43 (the position P1 shown in FIG. 6) is 0.20 mm. The rate of increase of the width of the land adjacent to the first major cutting edge 43 is larger than the rate of increase of the width of the land adjacent to the second major cutting edge 42.

More specifically, in the present embodiment, since the length of the first major cutting edge 43 (a distance between P1 and P2) is 0.70 mm, the width W1 of the land at the narrowest width position is 0.20 mm, and the width W2 of the widest width position is 0.30 mm, the rate of increase of the width of the land is 0.143. In the present embodiment, since the length of the second major cutting edge 42 (a distance between P0 and P1) is 1.70 mm, the width W0 of the land at the narrowest width position is 0.10 mm, and the width W1 of the land at the widest width position is 0.20 mm, the rate of increase of the width of the land is about 0.059. Accordingly, the rate of increase of the width of the land adjacent to the first major cutting edge 43 is about 2.4 times larger than the rate of increase of the width of the land adjacent to the second major cutting edge 42.

It should be noted that the land width can be configured to decrease from the connecting part between the first major cutting edge 43 and the first corner cutting edge 41 toward a connecting part between the flat cutting edge 44 and the second major cutting edge 42 belonging to an adjacent cutting edge portion group, along the first corner cutting edge 41 and the flat cutting edge 44.

Figure 7:
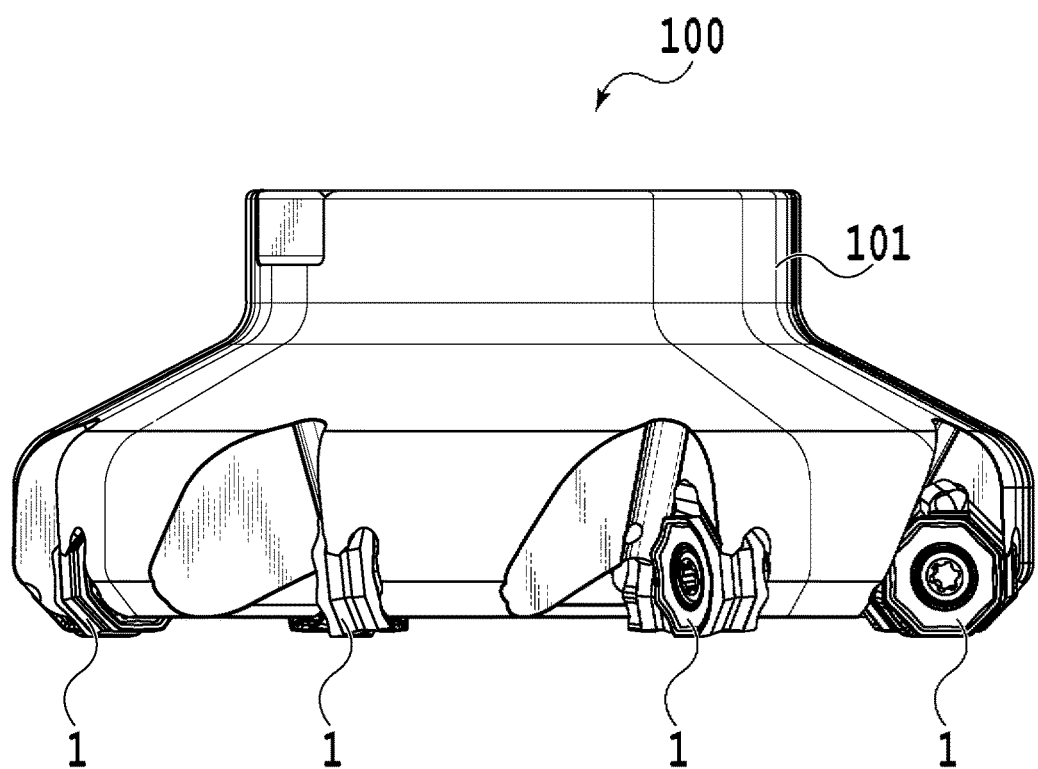
FIG. 7 is a front view showing a cutting tool on which the cutting insert of FIG. 1 is mounted.
Figure 8:
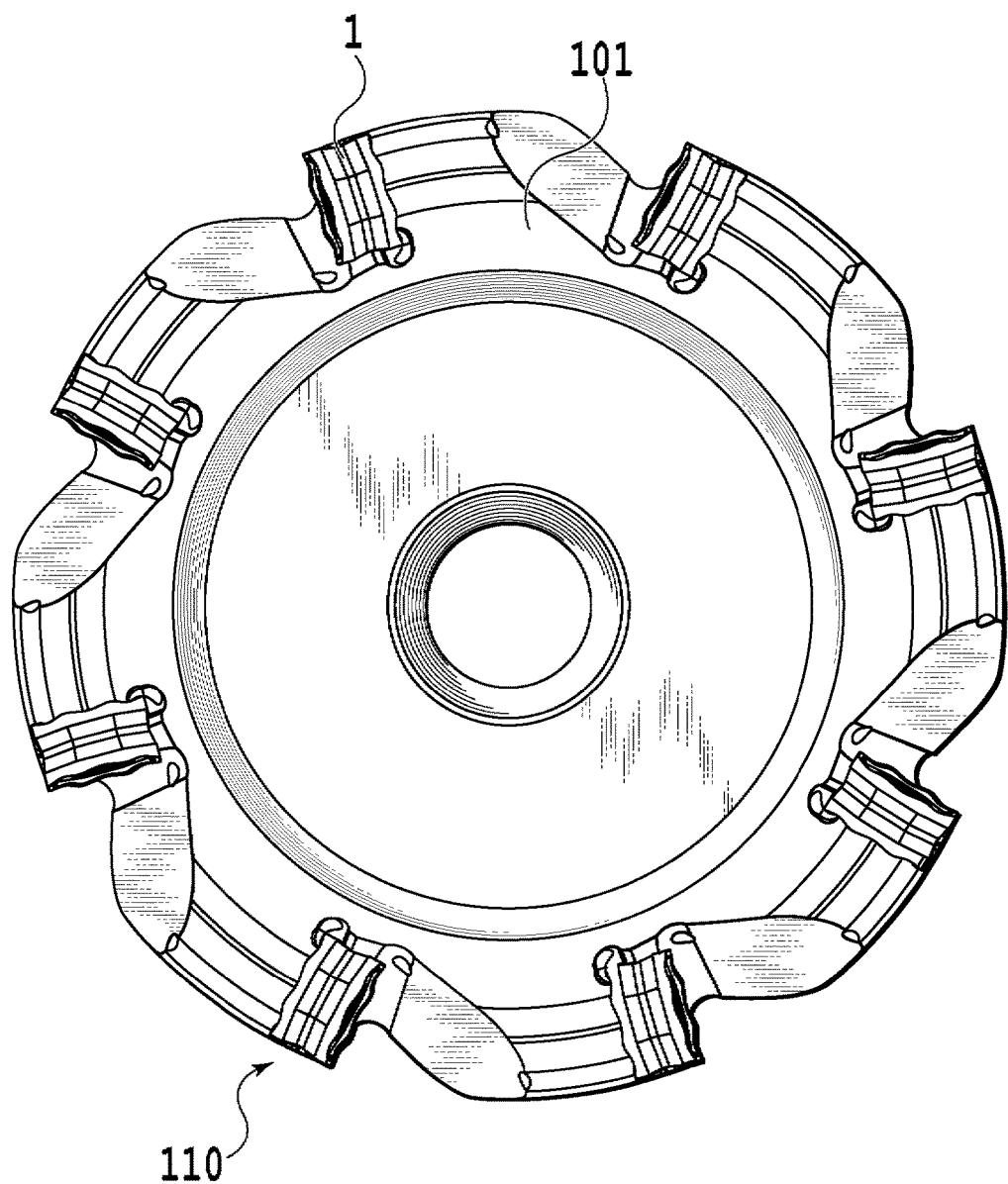
FIG. 8 is a bottom view showing the cutting tool of FIG. 7.

FIGS. 7 and 8 show a cutting tool on which the cutting insert 1 in the above-mentioned embodiment is mounted. The cutting tool 100 is constituted by a cylindrical body 101 and eight cutting inserts 1, and insert mounting seats 110 (FIG. 9) for mounting the cutting inserts 1 are formed at a leading end of the body 101 along the circumferential direction of the body 101. The cutting inserts 1 placed on the insert mounting seats 110 are fixed by screws. A central axis of a threaded hole formed in a bottom surface 115 of the insert mounting seat 110 is formed at a position closer to a side wall 111 of the insert mounting seat 110 with respect to a central axis of the through hole 14 of the cutting insert 1. With such configuration, since the cutting insert 1 is pressed against the side wall 111, the cutting insert 1 is fixed to the insert mounting seat 110 more rigidly. Since the side surface of the cutting insert 1 is not provided with a clearance angle, the cutting insert 1 is mounted so as to be inclined forward in a tool rotating direction in order to provide an appropriate gap (a so-called "clearance") between a workpiece and the side surface.

Figure 9:
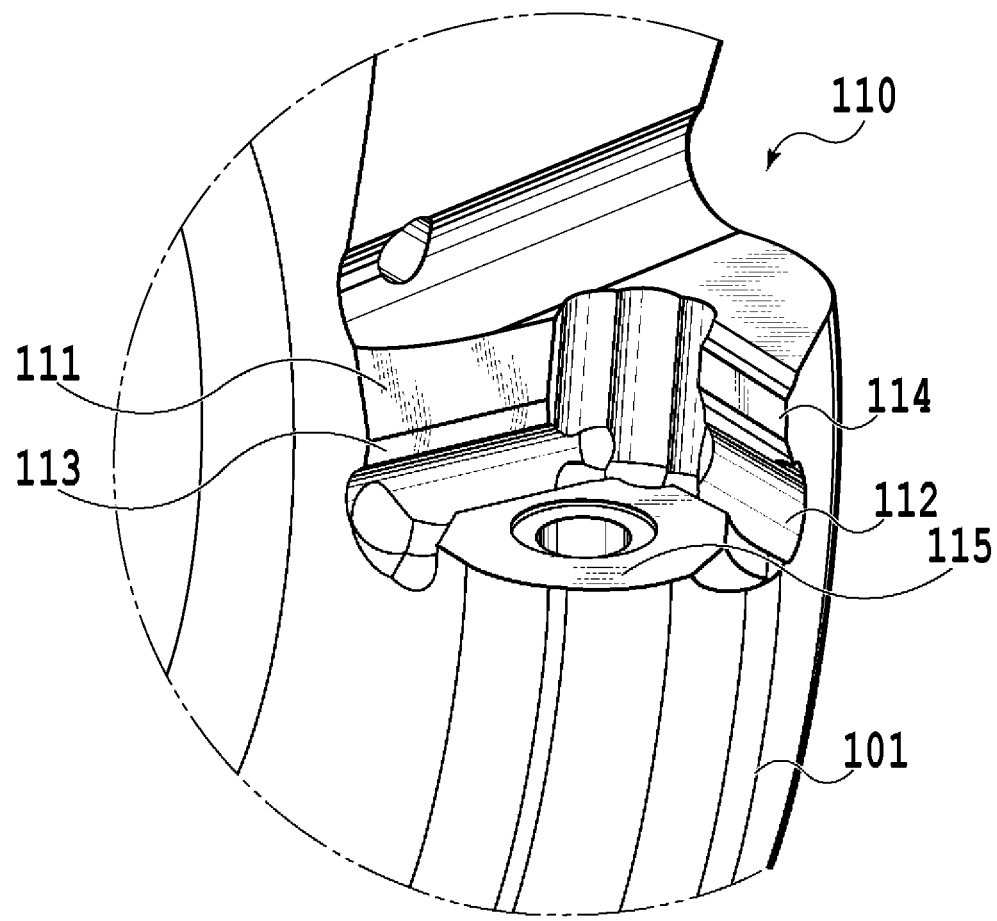
FIG. 9 is an enlarged view showing an insert mounting seat of the cutting tool of FIG. 7.

As shown in FIG. 9, wall surfaces of two side walls (first and second side walls) 111, 112 of the insert mounting seat 110 are provided with projected parts 113, 114, respectively. Comparing the heights of the two projected parts 113, 114 with respect to the bottom surface 115 of the insert mounting seat 110, the projected part 114 formed on the side wall 112 located on a relatively outer side of the body 101 is formed at a higher position. When the cutting insert 1 is mounted on the insert mounting seat 110, the projected part 114 formed at a higher position is brought into contact with the first inclined surface 33 of the recessed part 32 formed in the side surface 31 of the cutting insert 1, and the projected part 113 formed at a lower position is brought into contact with the second inclined surface 34 of the side surface.

Next, advantageous effects provided by the cutting insert 1 will be described. By configuring the width of the land 12 formed adjacent to the first major cutting edge 43 on the upper surface 11 so as to increase toward the corner cutting edge, a direction in which chips are discharged will be changed to a direction at right angles to the land 12 (a direction indicated by arrow A2 in FIG. 6), not a direction at right angles to the first major cutting edge (a direction indicated by arrow A1 in FIG. 6). Since the direction A2 at right angles to the land 12 is a direction away from a surface of the workpiece that is cut by the flat cutting edge 44, the chips discharged from the first corner cutting edge 41 and the flat cutting edge 44 move away from the cutting edges relatively rapidly. Thus, loads to be applied to the first corner cutting edge 41 and the flat cutting edge 44 will be decreased and the first corner cutting edge 41 will become resistant to chipping. In addition, since the width of the land 12 is maximized in the vicinity of the first corner cutting edge 41, the first corner cutting edge 41 itself is strengthened.

Since the first major cutting edge 43 and the second major cutting edge 42 intersect with each other at an obtuse interior first angle θ, the direction A2 of a first chip portion discharged from the first major cutting edge 43 and a direction of a second chip portion discharged from the second major cutting edge 42 (a direction indicated by arrow A3 in FIG. 6) intersect with each other. This intersection occurs by configuring at least the width of the land adjacent to the first major cutting edge 43 so as to increase toward (i.e., in the direction of) the first corner cutting edge 41. However, if the width of the land adjacent to the second major cutting edge 42 is also configured so as to increase toward the first corner cutting edge 41 and the rate of increase of the width of the land of the first major cutting edge 43 is larger than the rate of increase of the width of the land of the second major cutting edge 42, the direction A2 of the chip portion discharged from the first major cutting edge 43 and the direction A3 of the chip portion discharged from the second major cutting edge 42 intersect with each other at a larger angle. As a result, in terms of the entirety of the chips, the chips will curl so as to converge toward between the first major cutting edge 43 and the second major cutting edge 42. In other words, repulsive force will be generated between the first chip portion discharged from the first major cutting edge 43 and the second chip portion discharged from the second major cutting edge 42. This causes part of the load applied to the first major cutting edge 43 to be borne by the second major cutting edge 42 and the degree of such load bearing is larger as compared to a case in which the intersecting angle between chip portions is small, e.g., in a case in which the rate of increase of the width of the land is equal between the first major cutting edge 43 and the second major cutting edge 42. Since the second chip portion discharged from the second major cutting edge 42 that mainly generates chips, due to its longer length as compared to the length of the first major cutting edge 43, pushes the first chip portion discharged from the first major cutting edge 43 and corrects the flow of discharge of such first chip portion, the load applied to the first major cutting edge 43 will be reduced. By reducing the load applied to the first major cutting edge 43, the first corner cutting edge 41 becomes further resistant to chipping.

Since the second major cutting edge 42 and the first major cutting edge 43 formed on the upper surface 11 are inclined so as to approach the lower surface 21 as the distances from the first corner cutting edge 41 increase, as shown in FIG. 4, axial rake angles can be set to positive values and the cutting ability is improved.

The recessed part 32 formed in the side surface of the cutting insert 1 of the present embodiment provides an effect of preventing, for example, lifting of the cutting insert 1 caused by the cutting resistance. Specifically, when cutting force in a direction toward the bottom surface of the insert mounting seat is applied to the second major cutting edge 42 and the first major cutting edge 43, a portion of the bottom surface of the cutting insert 1 which is located on the opposite side of the second major cutting edge 42 and the first major cutting edge 43 with the through hole 14 therebetween nearly starts to be lifted up from the bottom surface of the insert mounting seat. However, the projected part 113 that is in contact with the second inclined surface 34 functions to suppress such lifting.

The projected part 114 is brought into contact with the first inclined surface 33 to thereby suppress the lifting on a leading end side of the cutting insert 1 that is generated due to uneven contact between a head of the fastening screw and an inner wall of the through hole 14. In other words, since the central axis of the screw is displaced on the side wall 111 side with respect to the central axis of the through hole 14, the cutting insert 1 receives, from the screw, a moment in a direction in which a portion of the cutting insert 1 which is located on the leading end side of the tool is lifted up. However, since the projected part 114 that is in contact with the first inclined surface 33 inversely applies a moment in a direction in which the portion located on the leading end side of the tool of the cutting insert 1 is pressed against the bottom surface side of the insert mounting seat 110, the lifting of the cutting insert 1 is prevented.

The present invention may employ various forms other than the above-mentioned embodiment without departing from the gist of the invention. For example, although the basic shape in a planar view is octagonal in the above-mentioned embodiment, other polygonal shapes, such as quadrangles, pentagons and hexagons, may be employed. Although the cutting insert 1 is formed with the upper surface 11 and the lower surface 21 having the same shape so that the cutting insert 1 can also be used by turning it upside down, the cutting insert 1 may be provided with cutting edges on only one of the surfaces and the cutting edges may be provided on only part of the intersecting edge between such one surface and the side surface. That is to say, it is only necessary that the cutting edges are provided partially or entirely on the intersecting edge between the side surface and at least one of the two opposing surfaces that have a polygonal shape.

Although the side surface of the cutting insert 1 is not provided with a clearance angle in the above-mentioned embodiment, the cutting insert may be of a so-called positive type with a clearance angle provided on the side surface.

The second major cutting edge 42, the first major cutting edge 43 and the flat cutting edge 44 do not have to be formed in a linear shape as in the above-mentioned embodiment. Specifically, one or more cutting edge portions may be in a curved shape. If a cutting edge portion is in the curved shape, the above-mentioned various angles can be defined by using a chord formed by connecting ends of such cutting edge portion. For example, assuming that the first major cutting edge 43 is in a linear shape and the second major cutting edge 42 is in a curved shape (arc-like shape), the above-mentioned first angle θ is defined as a relationship between the linear first major cutting edge 43 and the chord formed by connecting the ends of the curved second major cutting edge 42 (i.e., the chord corresponding to the arc formed by the second major cutting edge 42).

Although the first angle θ formed by the second major cutting edge 42 and the first major cutting edge 43 is set to 175 degrees in the above-mentioned embodiment, the first angle is not limited thereto. It has been verified that a sufficient effect can be obtained by setting the first angle θ formed by the second major cutting edge 42 and the first major cutting edge 43 to 130 degrees≤θ<180 degrees.

Although the rate of increase of the width of the land adjacent to the first major cutting edge 43 is about five times larger than the rate of increase of the width of the land adjacent to the second major cutting edge 42 in the above-mentioned embodiment, the rate of increase is not limited to such value. It has been verified that a sufficient effect can be obtained by configuring the rate of increase for the land of the first major cutting edge 43 so as to be about two to five times larger than the rate of increase for the land of the second major cutting edge 42.

Although the land angle is set to 5 degrees in the above-mentioned embodiment, the land angle is not limited to such value and may be changed as appropriate as a matter of course, depending on the manner of use of the cutting insert.

What is claimed is:

1. A cutting insert comprising an upper surface, a lower surface, and a side surface connecting the upper surface and the lower surface, wherein:
    an intersecting edge between the upper surface and the side surface is partially or entirely provided with an upper cutting edge comprising a plurality of cutting edge portion groups;
    in a plan view of the upper surface, each cutting edge portion group comprises a linear or curved first major cutting edge, a linear or curved second major cutting edge connected to the first major cutting edge, a substantially arc-like corner cutting edge connected to the first major cutting edge on an opposite side of the second major cutting edge, and a linear or curved flat cutting edge connected to the corner cutting edge on an opposite side of the first major cutting edge;
    an interior first angle (θ) formed by the linear second major cutting edge or a chord formed by connecting both ends of the curved second major cutting edge, and the linear first major cutting edge or a chord formed by connecting both ends of the curved first major cutting edge, is an obtuse angle;
    an interior second angle (α) formed by the flat cutting edge and the linear first major cutting edge or the chord of the curved first major cutting edge is larger than an interior third angle (β) formed by the flat cutting edge and the linear second major cutting edge or the chord of the curved second major cutting edge;
    a land is provided adjacent to the first major cutting edge on the upper surface; and
    a width of the land provided adjacent the first major cutting edge increases toward the corner cutting edge.

2. The cutting insert according to claim 1, wherein:
    the land is also provided adjacent to the second major cutting edge on the upper surface,
    a width of the land provided adjacent to the second major cutting edge also increases toward the corner cutting edge, and
    a rate of increase of the width of the land adjacent to the first major cutting edge is larger than a rate of increase of the width of the land adjacent to the second major cutting edge.

3. The cutting insert according to claim 2, wherein:
    the rate of increase of the width of the land adjacent to the first major cutting edge is two to five times larger than the rate of increase of the width of the land adjacent to the second major cutting edge.

4. The cutting insert according to claim 1, wherein, in a side view of the insert:
    the second major cutting edge and the first major cutting edge are inclined with respect to the lower surface; and
    a direction of inclination is set such that the second major cutting edge and the first major cutting edge approach the lower surface as distances from the corner cutting edge increase.

5. The cutting insert according to claim 1, wherein:
    an intersecting edge between the lower surface and the side surface is partially or entirely provided with a lower cutting edge;
    the lower cutting edge also comprises a plurality of cutting edge portion groups;
    the lower cutting edge has the same shape as the upper cutting edge formed on the intersecting edge between the upper surface and the side surface.

6. The cutting insert according to claim 1, wherein:
    the side surface is provided with a first inclined surface arranged on an upper surface side and a second inclined surface arranged on a lower surface side with respect to the first inclined surface,
    the first inclined surface being inclined such that a portion closer to the lower surface is located closer to a center of the cutting insert,
    the second inclined surface being inclined such that a portion closer to the upper surface is located closer to the center of the cutting insert.

7. A tool body on which the cutting insert according to claim 6 is mounted, wherein:
    the tool body comprises an insert mounting seat for mounting the cutting insert;
    the insert mounting seat comprises a first side wall; and
    the first side wall comprises a projected part that is brought into contact with the second inclined surface formed in the side surface of the cutting insert.

8. The tool body according to claim 7, wherein:
    an outer shape of the tool body is cylindrical;
    the insert mounting seat further comprises a second side wall that is located on an outer circumferential side of the body with respect to the first sidewall; and
    the second side wall comprises a projected part that is brought into contact with the first inclined surface formed in the side surface of the cutting insert.

9. A cutting insert comprising an upper surface, a lower surface, and a side surface connecting the upper surface and the lower surface, wherein:
    an intersecting edge between the upper surface and the side surface is provided with an upper cutting edge comprising a plurality of cutting edge portion groups;
    in a plan view of the upper surface, each cutting edge portion group comprises a first major cutting edge, a second major cutting edge connected to the first major cutting edge, a substantially arc-like corner cutting edge connected to the first major cutting edge on an opposite side of the second major cutting edge, and a flat cutting edge connected to the corner cutting edge on an opposite side of the first major cutting edge;
    an interior first angle (θ) formed between the second major cutting edge and the first major cutting edge is an obtuse angle;

an interior second angle (α) formed by the flat cutting edge and the first major cutting edge is larger than an interior third angle (β) formed by the flat cutting edge and the second major cutting edge;

a land is provided adjacent to the first major cutting edge on the upper surface; and a width of the land provided adjacent the first major cutting edge increases toward the corner cutting edge.

10. The cutting insert according to claim 9, wherein:
the land is also provided adjacent to the second major cutting edge;
a width of the land provided adjacent to the second major cutting edge also increases toward the corner cutting edge; and
a rate of increase of the width of the land adjacent to the first major cutting edge is larger than a rate of increase of the width of the land adjacent to the second major cutting edge.

11. The cutting insert according to claim 10, wherein:
the rate of increase of the width of the land adjacent to the first major cutting edge is two to five times larger than the rate of increase of the width of the land adjacent to the second major cutting edge.

12. The cutting insert according to claim 10, wherein, in a side view of the insert:
the second major cutting edge and the first major cutting edge are inclined with respect to the lower surface; and
a direction of inclination is set such that the second major cutting edge and the first major cutting edge approach the lower surface as distances from the corner cutting edge increase.

13. The cutting insert according to claim 10, wherein:
an intersecting edge between the lower surface and the side surface is provided with a lower cutting edge;
the lower cutting edge also comprises a plurality of cutting edge portion groups; and
the lower cutting edge has the same shape as the upper cutting edge formed on the intersecting edge between the upper surface and the side surface.

14. The cutting insert (1) according to claim 10, wherein:
the side surface is provided with a first inclined surface arranged on an upper surface side and a second inclined surface arranged on a lower surface side with respect to the first inclined surface,
the first inclined surface being inclined such that a portion closer to the lower surface is located closer to a center of the cutting insert,
the second inclined surface being inclined such that a portion closer to the upper surface is located closer to the center of the cutting insert.

15. The cutting insert according to claim 10, wherein:
in said plan view of the upper surface, at least one of the following is curved:
the first major cutting edge;
the second major cutting edge; and
the flat cutting edge.

16. The cutting insert according to claim 15, wherein:
in said plan view of the upper surface, at least two of the following are curved:
the first major cutting edge;
the second major cutting edge; and
the flat cutting edge.

17. The cutting insert according to claim 16, wherein:
in said plan view of the upper surface, all three of the following are curved:
the first major cutting edge;
the second major cutting edge; and
the flat cutting edge.

18. The cutting insert according to claim 10, wherein:
the rate of increase of the width of the land adjacent to the first major cutting edge is two to five times larger than the rate of increase of the width of the land adjacent to the second major cutting edge; and
in a side view of the insert:
the second major cutting edge and the first major cutting edge are inclined with respect to the lower surface; and
a direction of inclination is set such that the second major cutting edge and the first major cutting edge approach the lower surface as distances from the corner cutting edge increase.

19. The cutting insert according to claim 18, wherein:
the side surface is provided with a first inclined surface arranged on an upper surface side and a second inclined surface arranged on a lower surface side with respect to the first inclined surface,
the first inclined surface being inclined such that a portion closer to the lower surface is located closer to a center of the cutting insert,
the second inclined surface being inclined such that a portion closer to the upper surface is located closer to the center of the cutting insert.

20. A tool body on which the cutting insert according to claim 19 is mounted, wherein:
the tool body has an outer cylindrical shape;
the tool body comprises an insert mounting seat for mounting the cutting insert;
the insert mounting seat comprises a first side wall and a second side wall, the second side wall being located on an outer circumferential side of the tool body with respect to the first sidewall;
the first side wall comprises a projected part that is brought into contact with the second inclined surface formed in the side surface of the cutting insert; and
the second side wall comprises a projected part that is brought into contact with the first inclined surface formed in the side surface of the cutting insert.

* * * * *